PRODUCTION OF HOT-PRESSED THREE-DIMENSIONAL FIBER ARTICLES

Original Filed Dec. 27, 1961 2 Sheets-Sheet 1

Inventors
Philip E. Caron
Gene A. Grove
Leslie G. Miller &
by John M. Crawford
Attorneys

PRODUCTION OF HOT-PRESSED THREE-DIMENSIONAL FIBER ARTICLES

Original Filed Dec. 27, 1961 2 Sheets-Sheet 2

Inventors
Philip E. Caron
Gene R. Grove
by Leslie G. Miller &
John F. R. Barfield
Attorneys United States Patent Office Re. 26,376
Reissued Apr. 16, 1968

26,376

PRODUCTION OF HOT-PRESSED THREE-DIMENSIONAL FIBER ARTICLES

Philip E. Caron and Gene A. Grove, Longview, Wash., assignors to Weyerhaeuser Company, Tacoma, Wash., a corporation of Washington Original No. 3,261,898, dated July 19, 1966, Ser. No. 162,440, Dec. 27, 1961. Application for reissue Mar. 20, 1967, Ser. No. 626,360
3 Claims. (Cl. 264—119)

Matter enclosed in heavy brackets [ ] appears in the original patent but forms no part of this reissue specification; matter printed in italics indicates the additions made by reissue.

*ABSTRACT OF THE DISCLOSURE*

*A method of manufacturing a three-dimensional article by felting and compressing a mat containing 10 to 35% by weight of a thermosetting-thermoplastic resin mixture and the remainder wood fiber, cutting V-shaped recesses in the outer periphery of the mat, steaming the mat, and forming, heating and compressing the mat in a die so that the edges of the V-cuts overlap and fuse to form the corners of the three-dimensional article.*

The present invention relates generally to the production of contoured fibrous articles, and in particular, to converting flat panel-form fiber felts to rigid three-dimensional forms, especially box-like structures.

Heretofore, three-dimensional fiber forms produced by hot-compression have been effected by producing a non-planar preform of three dimensions suitable to fit within a die in which the preform is subsequently hot-pressed by an advancing punch. Compositions for such preforms comprise felted fiber with added resin material, such as thermosetting resin or thermoplastic resin.

It is the object of the present invention to eliminate the preparation of a three-dimensional preform and to provide a peripherally contoured flat panel of a suitable fiber-resin composition, the contour being such that it may be moved into a die by an advancing punch, and further, such that there may result overlapping of portions of the panel within the die which fuse together in the hot-pressing operation.

In the present invention a planar sheet or panel form of felted fiber is provided containing added heat-softenable resinous material and being of suitable thickness and density so that it can be formed into a predetermined shape by entry into a die for hot-compression between the inner walls of the die and a punch.

The composition of the panel form is such that it performs two major functions. Within the panel form itself, the resinous content is softened at least by the initial action of heat so as to lubricate the fibers to permit movement thereof in the forming. The panel form is provided with an irregular periphery characterized by one or more recesses inwardly as required for the shape of the body to be formed, the edge portions of the recess or recesses being so formed that they overlap in advancing the punch into the die. The resinous content of the panel form for overlapping regions is such that the heat effects fusion of resin within the overlapping portions, thus integrating the regions of the formed body which become in effect seams from the original panel form.

Accordingly, the resinous additives include resin which softens with heat and which in the cooled hot-pressed body is solid to rigidify the compressed fiber content. Thermoplastic resinous material is one form of resin to provide this result. Neverthless, thermosetting resin may be used when it is present in the sheet material in a form first to soften and flow under heat and pressure, and then to thermoset. Resins such as phenol-formaldehyde, urea-formaldehyde, polyesters, polyurethanes, epoxies, resorcinol-formaldehyde, and melamine-formaldehyde as coating on the fibers, or as a powder distributed among the fibers, are suitable.

The preferred resinous additive is a mixture of thermoplastic resinous material and thermosetting resinous material, when the panel form to be molded is preconditioned, immediately before the hot-pressing operation.

The moisture content of the fibers is determinative of their flexibility. Very dry fibers would break in the forming process. Very moist fibers must lose the water content in the die, leading to prolonged closure of the die while steam escapes, lest the formed body be ruptured by escaping pressure pockets of steam on opening of the die. Accordingly, the moisture content is in the range from 10 to 18% based on the weight of oven-dry fiber content, when up to 16% of resin is present. As resin content increases the minimum for moisture content is less important.

The moisture content can be controlled by a steaming operation, preferably using steam of 90% or better quality, for example, by subjecting the panel material to such steam. This may be done by passing steam through the panel, or better, by subjecting both faces of the panel simultaneously to open-faced chambers or platens containing such steam. The increase of temperature and the moisture content plasticize the fibers for flexibility in the forming operation. By having present an effective quantity of thermoplastic resin, the steam softens the resin, thus assisting in forming the fibers into new positions.

In using only thermoplastic resin, the formed body is not rigid until it has cooled. Hence, the presence of an effective quantity of thermosetting resin provides a rigid article on opening the die for removal of the formed body. The content of resin for the purposes above described must be sufficient to effect fusion of overlapping edges of the panel.

One feature of the invention is that the planar panel stock does not require preforming to a contoured form to fit a die for subsequent hot forming. Rather, the peripheral contour of the flat panel stock is predetermined by the shape of the body to be formed. This is illustrated by reference to the formation of a box-like structure as shown in the accompanying drawings, in which.

Although the invention is illustrated in detail by reference to a rectangular box-like structure, the invention may be practiced by use of simpler forms, suitable to produce a cone or a trihedral form, or a three-sided box. In a four-sided box, there are four trihedral forms, each consisting of the box bottom and two sides. In a three-sided box there are three trihedral forms. The drawings and description, therefore, exemplify the formation from a planar fiber-resin sheet of a cone or other form, such as a trihedral structure not necessarily present in a rectangular box-like structure.

Figure 1:
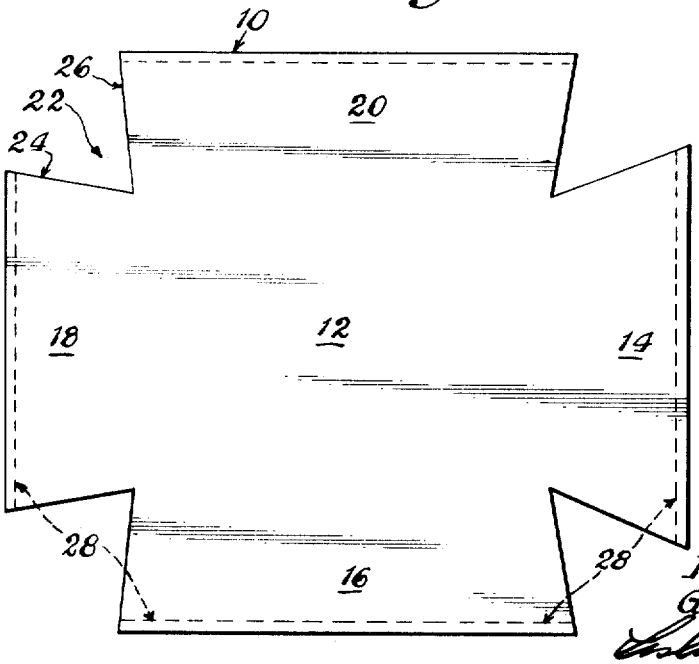
FIG. 1 shows a dimensioned precut panel of felted fiber containing added resin, the peripheral contour being predetermined by the box-like form to be produced.

FIG. 1 shows a contoured-cut flat panel 10 of fiber-resin compositions such as those hereinafter described as to composition thickness and density. It has a central body portion 12 for the bottom of a box and four wings 14, 16, 18 and 20 for box-sides. The peripherally adjacent wings 18 and 20 define a V-shaped cut 22 into the form, with a vertex approximately at the location in the ultimate box of the junction of the wings 18 and 20 as box sides with the bottom. The edges which define the V 22 are designated 24 at the wing 18 and 26 at the wing 20. Rather than these edges butting each other in the die to form the box and seam between the box sides, they are placed so that they overlap from about 1/16 to 1/2 inch for fusion together. The lesser amount is at the vertex with the greater overlap at the outer lip. The die at the areas for the box bottom and sides and the corresponding walls of the punch are preferably such as to form a uniformly thick space between them in which the panel is compressed. Because of the overlap, the space at the corner regions gradually enlarges up to about 50% thus to receive the overlapping edges 24 and 26 for compressing to a density close to that of the bottom and sides of the box.

The dotted lines 28 indicate portions of the edges of the wings which form an integral peripheral lip or flange around the top of the box. The extent of overlap of the edges 24 and 26 is such as to effect overlap of the lip-forming portions. The wider the lip or flange, the greater must be the extent of overlap when the cut lines 24 and 26 are straight lines as shown. Very wide peripheral flanges may call for departure from such straight lines to provide for adequate overlap in the flange.

Figure 2:
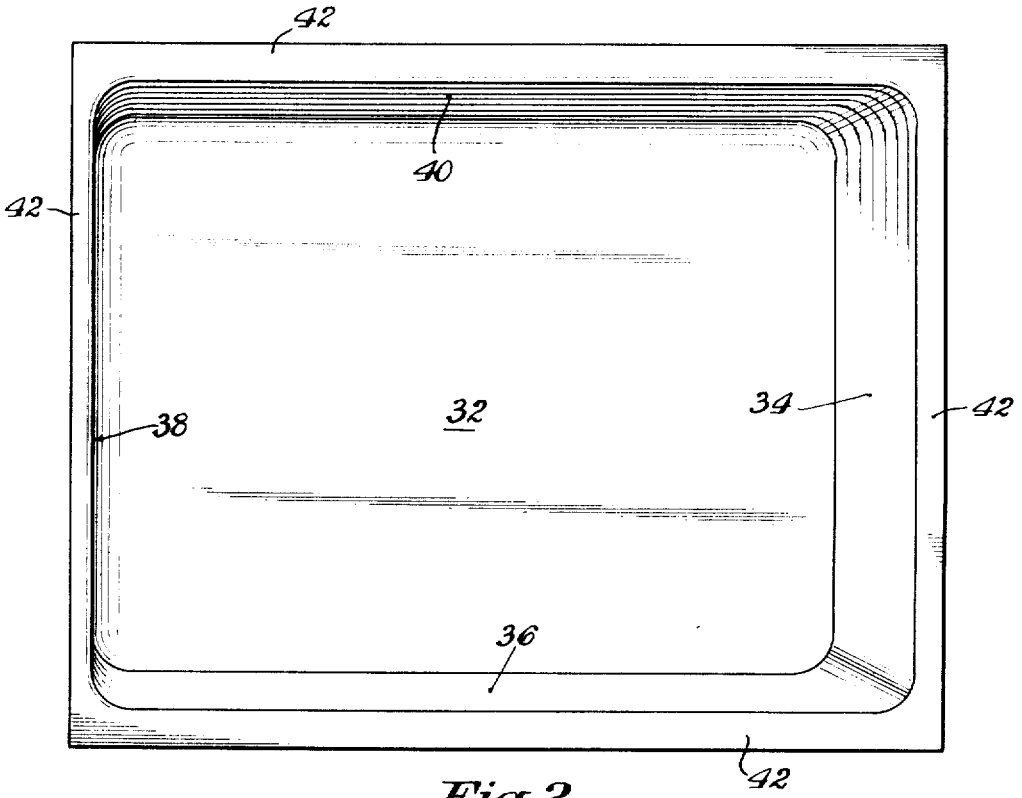
FIG. 2 is a plan view of the box-like form.
Figure 3:
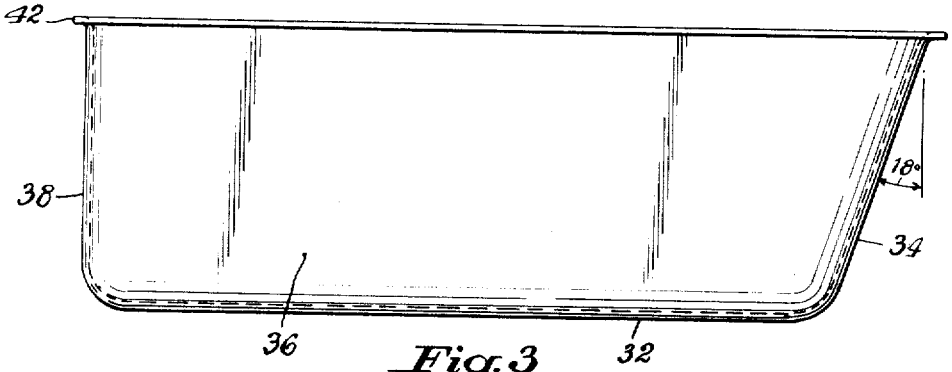
FIG. 3 is a long-side view of the box of FIG. 2.

FIG. 2 is a plan view of an open-top box-like structure, suitable for use as a drawer, shaped by forming and hot-passing the cut-panel of FIG. 1. It has a bottom 32, end wall 34 sloping 18° from the vertical (FIG. 3), long side wall 36 sloping 9° from the vertical, perpendicular or vertical end wall 38, and long side wall 40 sloping 9° from the vertical. The vertical corners have a radius of 1-inch. Around the whole is a peripheral flat lip or flange 42 formed by the parts outside the dotted lines 28 in FIG. 1.

Figure 4:
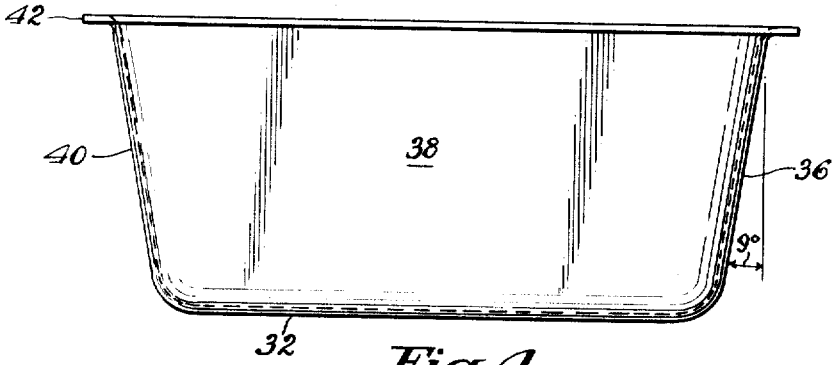
FIG. 4 is an end-view of the box of FIG. 2.

All the corners of the box are rounded. With respect to the box shown, exemplary curvatures for the corner regions are described. For the corners between the box sides the radius of curvature may be 1-inch. The radius between flange 42 and end wall 34 may be 1/4-inch (FIG. 3); between the flange 42 and vertical end wall 38 1/8-inch; and between flange 42 and side walls 36 and 40 1/4-inch (FIG. 4). The inside radius between the bottom 32 and the four surrounding walls may be 1-inch.

Typical dimensions for such a drawer might be an over-all length of 20 1/4", an over-all width of 15 11/16", and an over-all height of 7". The width of the end flanges might be 1/4" and the width of the side flanges might be 1/2". A blank for this drawer would have wings 16 and 20 with 21 1/2" long outer edges, a wing 18 with a 16 1/4" long outer edge, and a wing 14 with a 19" long outer edge. Edges 24 of wing 18 might be 6" long, and edges 24 of wing 14 might be 7" long. Edges 26 adjacent wing 18 might be 6 3/4" long and those adjacent wing 14 might be 7" long. It should be remembered that these dimensions are not critical but merely illustrative.

Figure 5:
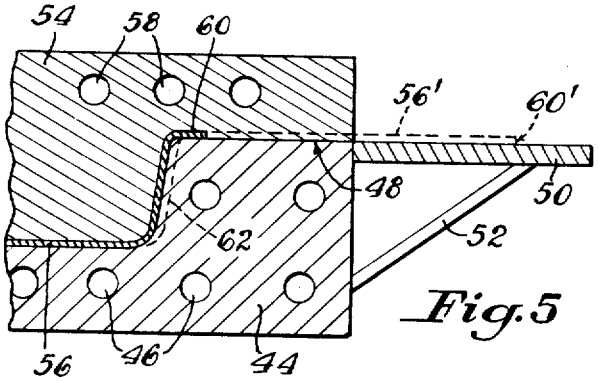
FIG. 5 is a fragmentary view partly in cross-section showing portions of the die and punch in closed position on a portion of the box of FIG. 2.

FIG. 5 shows a portion of the die designated 44, the openings 46 representing heating means, such as conduits for steam. The face 48 of the die is extended by a shelf 50 supported by bracket 52, to provide a table on which to rest the panel of FIG. 1. FIG. 5 shows the punch 54 at full entry in the die with the compressed panel 56, in the forming space. The position of the original panel is designated 56' in dotted lines resting on shelf 50 from which position it is pulled inwardly by the advancing punch. Punch 54 has openings 58 for steam or other heating means. The flange designated 60 in FIG. 5 is purposely made sufficiently wide so that it may be trimmed to the dimensions shown in FIGS. 2–4, thus assuring clean edges, and compensating for variations in the extent to which the edge designated 60' on the shelf 50 is pulled inwardly.

The dotetd line 62 in FIG. 5 represents the enlargement of the forming space at the corners where the overlap of the panel wings take place.

Figure 6:
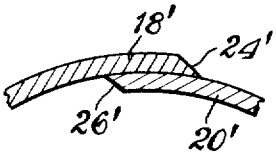
FIG. 6 is an enlarged fragmentary view in cross-section showing tapered edges in the overlap.

FIG. 6 is an enlarged detailed fragmentary view in cross-section at a corner, showing the overlap and the preferred form of cut edge. Relating FIG. 6 to FIG. 1, the portion designated 18' has its cut-edge 24' corresponding to line 24 in FIG. 1, cut on a bias to provide a tapered edge. The portion designated 20' has its cut-edge 26' corresponding to edge 26 in FIG. 1 as complementary to cut-edge 24', also providing a tapered edge. In overlapping for fusion together in the enlarged clearance space between the die and the punch, the density is more uniform and the fusion boundary smooth and less visual, in part as a result of locating the acute angles of the two tapers at opposite faces of the sheet.

Figure 7:
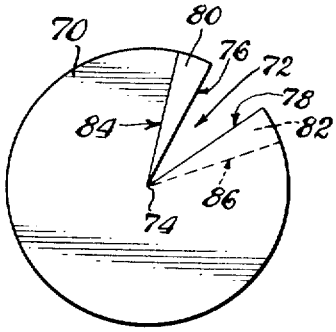
FIG. 7 represents a contoured piece for forming a cone.

FIG. 7 is a circular disk 70 of the fiber-resin panel having a V-cut 72 extending to its center 74. The edges 76 and 78 of the V are tapered with long tapering faces 80 and 82, defined, respectively, by lines 84 and 86. Thus, in a die shaped to effect overlap of faces 80 and 82, fusion takes place only at those faces forming a fused zone of thickness and density substantially the same as elsewhere in the resulting cone.

The fiber-resin felt may be produced by wetfelting, but it is preferably produced by an air-laying procedure such as shown in Heritage U.S. No. 2,757,150. Resin solutions, such as phenol-formaldehyde solution, or molten resins such as wood or petroleum resins, or resin powders such as wood rosin or phenol-formaldehyde powder, or resin emulsions such as polyvinyl acetate emulsion, or phenol-formaldehyde emulsion, may be sprayed or distributed into the individualized fibers moving in a continuous stream, preferably before the air-laying to a felt.

The resulting mat having a low density, for example, in the range from 1.5 to 3 pounds per cu. ft. is then compressed to a density of at least 20 pounds per cu. ft. to provide the panel form for the present invention. Such compression is effected by a process which preserves a suitable softening or softening and setting property of the resin. The resin property is preserved by cold-pressing as with rolls or platens. Hot-pressing must be controlled with respect to time and temperature when thermosetting resin is employed.

For example, wood chips difibered by the Asplund process are preferred. In so producing the fiber the resins which are not subject to being advanced or thermoset may be entered with the chips into the steam-pressure chamber where defibration takes place. Any or all of the resinous material may be added to the stream of fibers issuing from the Asplund defibrator as described in said Heritage patent.

The resinous additive may be entirely a thermoplastic resin, such as asphalt or wood rosin, or the pine wood resin described in Roberts No. 2,714,072, but preferably a mixture of thermoplastic and thermosetting resin is employed.

The pine wood resin of said Roberts patent is a residual by-product of producing wood rosin, as therein described. It is characterized as follows:

| | | |
|---|---|---|
| Acid number | | 105–140 |
| Saponification number | | 150–170 |
| Melting point (Hercules drop method) | ° F | 175–210 |
| Unsaponifiable matter | percent | 10–20 |
| Gasoline insoluble | do | 30–80 |
| Petroleum ether insoluble | do | 30–80 |

Another pine wood resinous product, known as "Vinsol," is described in Perry U.S. No. 2,503,407, and is used with wood fiber in amount upwardly from 10% of a mixture of such resin and wood fiber, as described by Roberts in U.S. No. 2,759,837. "Vinsol" is a by-product of the production of refined wood rosin from pine wood, being the residue remaining after removal of the turpentine by distillation and of the rosin by solvent extraction with a hydrocarbon solvent such as gasoline. The thermoplastic compositions of said Roberts patents are employed therein for shaping preforms and then hot-pressing. They may be used also in the present invention.

The following examples are illustrative:

| Example 1: | Parts by weight |
|---|---|
| Asplund wood fiber | 90 |
| "Vinsol" resin | 10 |
| Total resin=10%. | |

| Example 2: | Parts by weight |
|---|---|
| Douglas fir (Asplund) fiber | 89 |
| "Poly-pale"* resin | 10 |
| Thermosetting phenol-formaldehyde resin | 1 |
| Total resin=11%. | |

*A trademarked product of Hercules Powder Company, Wilmington, Delaware. It is an amorphous thermoplastic, acidic resin, made by treating natural wood rosin to cause about 40% of the unsaturated acids to unite as polymers.

| Example 3: | Parts by weight |
|---|---|
| Hemloc (Asplund) fiber | 84 |
| Polyvinyl acetate | 15 |
| Thermosetting phenol-formaldehyde resin | 1 |
| Total resin=16%. | |

| Example 4: | Parts by weight |
|---|---|
| Douglas fir (Asplund) fiber | 85 |
| Wood rosin | 5 |
| Polyvinyl acetate | 5 |
| Thermosetting phenol-formaldehyde resin | 5 |
| Total resin=15%. | |

Although the foregoing examples have resin additive in amount from 10% to 16%, 16% is not a critical limit, but merely one of economy. More may be used. Up to about 35 parts of resin to 65 parts of oven-dry fiber the composition is a felt. As the resin content increases beyond about said 35 parts, the composition becomes more and more a resin matrix containing fibers. For the purpose of the present invention, a felt is required for the panel to be used. Accordingly, the range for resin is from 10% to 35% of resin on the basis of resin plus fiber (oven dry basis).

The thickness and density of the panel form fiber felt may vary. In use the panel is quickly steamed, and while hot, is placed on the die and quickly punched. The density after steaming is preferably in the range from 25 to 30 lbs. per cu. ft. The thickness may vary according to the article to be produced. For the dimensioned box of FIG. 2, the panel of FIG. 1 has a density of 40 pounds per cu. ft., and a thickness of 0.210 inch, when composed according to Example 2 above.

The panel material is first pre-cut to a predetermined peripheral contoured pattern. Immediately after steaming, the pre-cut panel is placed over the die, and the punch moved in upon it for a dwell-time of about 30 seconds, with 15 seconds for slow release. The mechanical pressure is in the range 300 to 500 lbs. per sq. inch, and the temperature of the die and puch is in the range from 300° to 380° F. Under these conditions the form may be pressed to a density of 58 to 63 pounds per cu. ft.

Each V-shaped cut or other form of recess automatically overlaps its edges as it moves into the die. Then, in the die the overlap is bonded by fusion under the hot compressing force. As a result a trihedral structure may be produced by each V-cut, resulting in a rectangular box when using the contoured form of FIG. 1.

The invention may be carried out in numerous ways of which the foregoing description is merely illustrative of the invention set forth in the accompanying claims.

We claim:

1. The method of producing a deep drawn three-dimensioned article from a substantially flat felt, comprising: depositing wood fibers on a moving conveyor to form a felt containing in substantially uniform distribution added heat softenable resin in proportion of from 10 to 35 [parts] *percent* by weight [for 65 parts by weight] *on the basis* of *resin plus* oven-dry fibers, said resin consisting of a mixture of thermoplastic and thermosetting resin in kind and quantity such that upon heating said felt the resin is softened to lubricate the fibers to permit movement between the fibers in forming said article and upon compressing the hereinafter-mentioned overlapping portions of the piece causes said portions to fuse and integrate, compressing said felt to a uniformly thick and dense compressible panel, shaping the peripheral contour of the panel to provide a V-shaped recess having its vertex inwardly of the outer periphery of the piece, the shape of the recess being such that the length of material at the outer periphery is greater than the dimensions of the outer periphery of the shaped article and the dimension defined by the vertex of said recess is equal to the corresponding dimension of a three-dimensioned article whereby the material adjacent the edges of said recess will overlap in the three-dimensioned article, softening the shaped panel by the action of steam to provide a moisture content in the panel of from 10 to 18% based on the oven-dry weight of the fibers, placing the softened shaped panel over the cavity of a die, moving said piece into the die by an advancing punch whereby on full entry of the piece into the forming space between the die and punch the material adjacent the recessed edges will overlap, and hot compressing the same between a die and the punch whereby such overlapped portions fuse and integrate to form a uniform consolidated three-dimensional structure.

2. The method of claim 1 in which the overlap of the material adjacent the edges of the V-shaped recess increases from the vertex of the recess to the periphery of the article.

3. The method of claim 1 in which the edges of the V-shaped recess are biased with respect to the top and bottom faces of the piece.

References Cited

The following references, cited by the Examiner, are of record in the patented file of this patent or the original patent.

UNITED STATES PATENTS

| | | | |
|---|---|---|---|
| 1,912,931 | 6/1933 | Clay | 156—211 |
| 2,016,568 | 10/1935 | Zinser | 264—322 |
| 2,328,992 | 9/1943 | Nielsen | 264—110 |
| 2,544,019 | 3/1951 | Heritage | 161—170 |
| 2,564,695 | 8/1951 | Johnson et al. | 156—211 XR |

FOREIGN PATENTS

| | | |
|---|---|---|
| 843,288 | 3/1939 | France. |

ROBERT F. WHITE, *Primary Examiner.*

J. R. HALL, *Assistant Examiner.*